(134.)
J. V. D. ELDREDGE'S
HEMMER FOR SEWING MACHINES.
No. 4,693.
Reissued Jan. 2, 1872.
FIG. I.
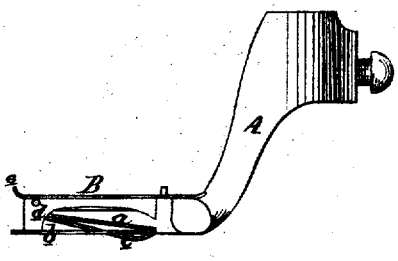
FIG. II.
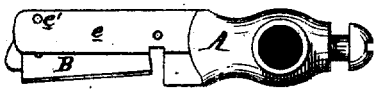
FIG. III.
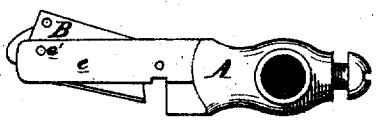
WITNESSES.
Geo. H. Graves
Thos. G. Parker
INVENTOR.
J. V. D. Eldredge
By Chas. A. Shaw
Atty.
AM. PHOTO-LITHOGRAPHIC CO. N.Y. (OSBORNE'S PROCESS.)

UNITED STATES PATENT OFFICE.

JOHN V. D. ELDREDGE, OF DETROIT, MICHIGAN, ASSIGNOR TO CHARLES A. SHAW, OF BIDDEFORD, MAINE, AND H. W. BOARDMAN, OF LOWELL, MASSACHUSETTS.

IMPROVEMENT IN HEMMERS FOR SEWING-MACHINES.

Specification forming part of Letters Patent No. 107,889, dated October 4, 1870; reissue No. 4,693, dated January 2, 1872.

*To whom it may concern:*

Be it known that I, JOHN V. D. ELDREDGE, of Detroit, in the county of Wayne and State of Michigan, have invented a new and useful Improvement in Hemmers for Sewing-Machines; and I do declare that the following is a true and accurate description thereof, reference being had to the accompanying drawing and to the letters of reference marked thereon and forming a part of this specification, in which drawing—

Figure 1 is an elevation of my improved hemmer with a portion of the side spring broken away to show the method of attaching and the operation of my pressure spring. Fig. 2 is a plan of the hemmer, showing it adjusted for turning a straight hem. Fig. 3 is the same adjusted for hemming on a curve.

Like letters indicate like parts in each figure.

The nature of this invention relates to the construction of hemmers for sewing-machines, and consists in an arrangement of parts as hereinafter described, whereby the thinnest goods may be hemmed as well as the heavier grades, without the irregularities which result from the use of the ordinary hemmer in working very light goods; also in making or constructing the hemmer in such a manner that the portion in which the guiding springs or scrolls for turning the hem are disposed may be swung around or have a lateral motion given to it for the purpose of enabling the operator to hem on a curve with greater perfection.

In the drawing, A represents the presser-foot, to which is hinged a hemmer, B, of the construction described in my application for Letters Patent, dated January 18, 1870, which application was allowed March 9th, 1870, except with a very important addition in the form of the spring *a*, shown in Fig. 1 of the accompanying drawing, by reference to which it will be seen that the tongue *b* and curved spring *c* are those in common use for turning the hem, and that *d* is the side spring described and lettered E in the said application, although the spring *a* of the present application is equally applicable to hemmers which are not provided with the spring E referred to. All hemmers must have the hem recess of sufficient height or area in cross section to receive and permit the passage of the roll formed on the edge of the thickest fabrics to which they are adapted; consequently when very light and thin goods are hemmed the fold or roll turned by the tongue *b* and curved spring *c* in the edge thereof is not compressed in the shape or form made by the said devices, and the tendency of the hem is to waver or unroll before it reaches the needle. This is obviated by the use of the spring *a*, which is attached to the upper part of the recess and extends downward as it approaches the ends of the tongue *b* and spring *c*, forming a throat out of which the fabric passes to the needle with a perfect hem folded in its edge, due to the light pressure exerted by the free end of the spring *a* on the upper surface of the fold or roll. The spring *a* yields readily when a cross-seam in the fold passes through the hemmer, removing the cause of a very frequent annoyance in hemmers of ordinary construction, resulting from the choking or clogging of the fabric therein when a seam is to be passed through the device. As shown, the hemmer-body is secured to the presser-foot which has an elastic plate, *e*, projecting over the top of the hemmer, carrying a stud, *e'*, on its under side, which stud engages with any of a series of radial holes in the top of the hemmer to secure it in any desired position when laterally adjusted, so that curved hems may be formed, or circular or bias goods may be hemmed therewith.

What I claim as new, and desire to secure by Letters Patent, is—

1. In a presser-foot hemmer the combination of the tongue *b*, curved spring *c*, and auxiliary spring *a*, with their free ends terminating in the immediate vicinity of the needle-opening, and constructed, arranged, and operating substantially as set forth, for the purposes specified.

2. A hemmer, B, hinged to the presser-foot, so as to be adjusted laterally, and provided with the auxiliary spring *a*, the tongue *b*, the spring *c*, the elastic holding-plate *e*, and the stud *e'*, when the several parts are constructed and arranged substantially as set forth, and used for the purposes specified.

Witnesses: JOHN V. D. ELDREDGE.
B. ELDREDGE,
RICHD. TREGASKIS.

(134)